(12) United States Patent
Hori et al.

(10) Patent No.: US 7,539,109 B2
(45) Date of Patent: May 26, 2009

(54) OPTICAL DISC DRIVE AND RECORDING METHOD FOR OPTICAL DISC DRIVE

(75) Inventors: Katsuo Hori, Kurume (JP); Kenji Takauchi, Katano (JP); Toshiya Akagi, Neyagawa (JP); Yasushi Ouchi, Kitakyushu (JP)

(73) Assignee: Panasonic Corporation, Osaka (JP)

( * ) Notice: Subject to any disclaimer, the term of this patent is extended or adjusted under 35 U.S.C. 154(b) by 835 days.

(21) Appl. No.: 10/982,829

(22) Filed: Nov. 8, 2004

(65) Prior Publication Data

US 2005/0105434 A1    May 19, 2005

(30) Foreign Application Priority Data

Nov. 14, 2003 (JP) ............................. 2003-384929
Oct. 13, 2004 (JP) ............................. 2004-298716

(51) Int. Cl.
G11B 7/0045 (2006.01)
(52) U.S. Cl. ..................... 369/59.11; 369/116
(58) Field of Classification Search .............. 369/59.11, 369/116
See application file for complete search history.

(56) References Cited

U.S. PATENT DOCUMENTS

| | | | | |
|---|---|---|---|---|
| 6,404,713 B1 * | 6/2002 | Ueki | ......................... | 369/47.53 |
| 6,496,459 B2 * | 12/2002 | Ueki | ......................... | 369/47.53 |
| 6,636,472 B2 * | 10/2003 | Kurebayashi et al. | ........ | 369/116 |
| 7,388,821 B2 * | 6/2008 | Yokoi | ......................... | 369/59.11 |
| 2006/0146670 A1 * | 7/2006 | Yokoi | ......................... | 369/47.5 |

FOREIGN PATENT DOCUMENTS

| | | | |
|---|---|---|---|
| JP | 5-266489 | | 10/1993 |
| JP | 2001297437 A | * | 10/2001 |
| JP | 2003-281733 | | 10/2003 |
| JP | 2003281733 A | * | 10/2003 |

* cited by examiner

Primary Examiner—Wayne R Young
Assistant Examiner—LaTanya Bibbins
(74) Attorney, Agent, or Firm—Wenderoth, Lind & Ponack, L.L.P.

(57) ABSTRACT

A recording method for an optical disc drive and an optical disc drive wherein a surrounding temperature is measured by a temperature sensor serving as temperature measuring device, a set surrounding temperature is correlated with a set recording rate by using a data table stored in an internal memory of a controller serving as correlating device, and a recording rate is changed by a digital signal processing portion serving as recording control device based on the surrounding temperature measuring result and the correlating result. The recording rate is changed by changing a ratio of a recording operation time and a recording-stop operation time with alternately repeating a recording operation and a recording-stop operation at as low a laser beam output as playback.

8 Claims, 8 Drawing Sheets

OPTICAL DISC DRIVE AND RECORDING METHOD FOR OPTICAL DISC DRIVE

FIELD OF THE INVENTION

The present invention relates to a recording method for an optical disc drive and an optical disc drive capable of recording information in a recording medium.

BACKGROUND OF THE INVENTION

Optical disc drives have been put into practical use in a range from audio CD to a CD-ROM, a CD-R/RW, and a DVD, and they have been applied to diversified fields and developments to achieve higher performance have been actively conducted. In particular, with rapid market expansion of personal computers, the percentage of optical disc drives that are built in personal computers has been increasing recently.

The configuration and the operation of an optical pick-up control portion in a conventional optical disc drive will now be described with reference to FIG. 8. Pick-up module 2 comprises spindle motor 3 to rotate optical disc 1, optical pick-up (hereinafter, referred to as PU) 4 to read an information signal from optical disc 1, and feed portion 6 to move carriage 5, on which PU 4 is mounted, in a radius direction of optical disc 1. A laser diode (not shown, and hereinafter, referred to as LD) serving as a light source of a laser beam is placed in PU 4, and is driven by laser driving portion 12. A laser beam is emitted to optical disc 1 from objective lens 14 by way of optical elements in PU 4, and reflection light therefrom is received at an optical sensor (not shown) in PU 4 again by way of objective lens 14 and the optical elements in PU4. Analog signal processing portion 8 generates a focus error signal and a tracking error signal on the basis of a signal output from the optical sensor in PU 4, and outputs these signals to servo processing portion 9.

The focus error signal is a signal indicating a shift in a focal point direction between a light beam spot emitted from objective lens 14 and a recording surface of optical disc 1. The tracking error signal is a signal indicating a shift in a radius direction between the light spot and information tracks on optical disc 1. Analog signal processing portion 8 also generates a lens position signal indicating relative locations of objective lens 14 and carriage 5, by extracting low-frequency components from the tracking error signal, and outputs the lens position signal to motor driving portion 10.

Servo processing portion 9 is formed in digital signal processing portion 11, and comprises an ON/OFF circuit, an arithmetic circuit, a filter circuit, an amplifier circuit, etc. It performs focus/tracking control on objective lens 14 to enable a light beam spot to follow information tracks on optical disc 1, and it further performs feed control to enable objective lens 14 to maintain nearly a neutral position, with the use of low-frequency components of the tracking error signal. Feed portion 6 comprises feed motor 7, a gear (not shown), a screw shaft (not shown), etc., and moves carriage 5 by rotating feed motor 7. In this instance, feed motor 7 outputs a feed motor pulse periodically. Controller 13 controls the overall servo portion configured as has been described.

During playback operations, PU 4 irradiates a laser beam to optical disc 1 at a low output, receives reflection light from optical disc 1 at the optical sensor, and outputs a playback signal corresponding to the received light to analog signal processing portion 8. And analog signal processing portion 8 further outputs the playback signal to digital signal processing portion 11.

Digital signal processing portion 11 comprises a data slicer, a data PLL circuit, a jitter measurement circuit, an error correction portion, a modulation/demodulation portion, a buffer memory, a laser control portion, etc., and transfers the playback signal to host computer 15 as valid data.

During recording operations, digital signal processing portion 11 modulates data sent from host computer 15, and sends a recording instruction from the laser control portion to laser driving portion 12. Laser driving portion 12 supplies the LD with a predetermined current, and records information in information tracks on optical disc 1 by causing the LD to emit light in pulses at a high output, for example, through a method referred to as a multi-pulse recording method. Controller 13 also controls the overall record and playback portion configured as has been described.

As the optical disc drive in recent years becomes thinner and lighter as well as compatible with a recordable DVD, heat generation in the LD serving as the light source of a laser beam and in a driver IC serving as laser driving portion 12 to drive the LD is being raised as a big issue. In other words, because an output of the LD for a recordable DVD is high in comparison with the LD for a CD-ROM and a CD-R/RW, a quantity of heat generation is large. The same can be said with respect to the driver IC. Further, in the case of an optical disc drive reduced in thickness and weight, a member, such as carriage 5, to hold the LD and the driver IC is also made thinner and lighter, and a heat capacity and a surface area are smaller than in those of a member in a conventional optical disc drive. Hence, the LD and the driver IC tend to reach high temperatures. Operations of the LD and the driver IC become unstable when they are heated above their respective rated compensation temperatures. They therefore may become uncontrollable and stop, and in the worst case, data recorded earlier may be broken. Otherwise, they have to be forced to stop. Examples in the arts are Japanese Patent Laid-Open Application No.H05-266489 and Japanese Patent Laid-Open Application No.2003-281733, etc.

The invention has an object to provide a recording method for an optical disc drive and an optical disc drive capable of preventing an LD serving as a light source of a laser beam and a driver IC serving as a laser driving portion from becoming uncontrollable as they are heated to high temperatures above their compensation temperatures due to own heat generation or the influences from ambient temperature, and thereby enabling recording to be continued in a stable manner without being interrupted or stopped until it ends.

SUMMARY OF THE INVENTION

According to the invention, a surrounding temperature (hereinafter, referred to as ST) is measured by temperature measuring device, a set ST is correlated with a set recording rate by correlating device, and a recording rate is changed by recording control device on the basis of a ST measuring result and a correlating result, wherein the recording rate is changed by changing a ratio of a recording operation time and a recording-stop operation time with repeating alternately a recording operation and a recording-stop operation at as low a laser beam output as playback. The invention exploits the fact that when the recording-stop operation at as low a laser beam output as playback is performed, the recording does not take place because an LD is inhibited from emitting light at a high output, but the temperatures of the LD serving as a light source of a laser beam and a driver IC serving as a laser driving portion can be reduced below their compensation temperatures in a reliable manner.

DETAILED DESCRIPTION OF THE EXEMPLARY EMBODIMENTS

Embodiments of the invention will now be described with reference to the drawings.

First Embodiment

Figure 1:
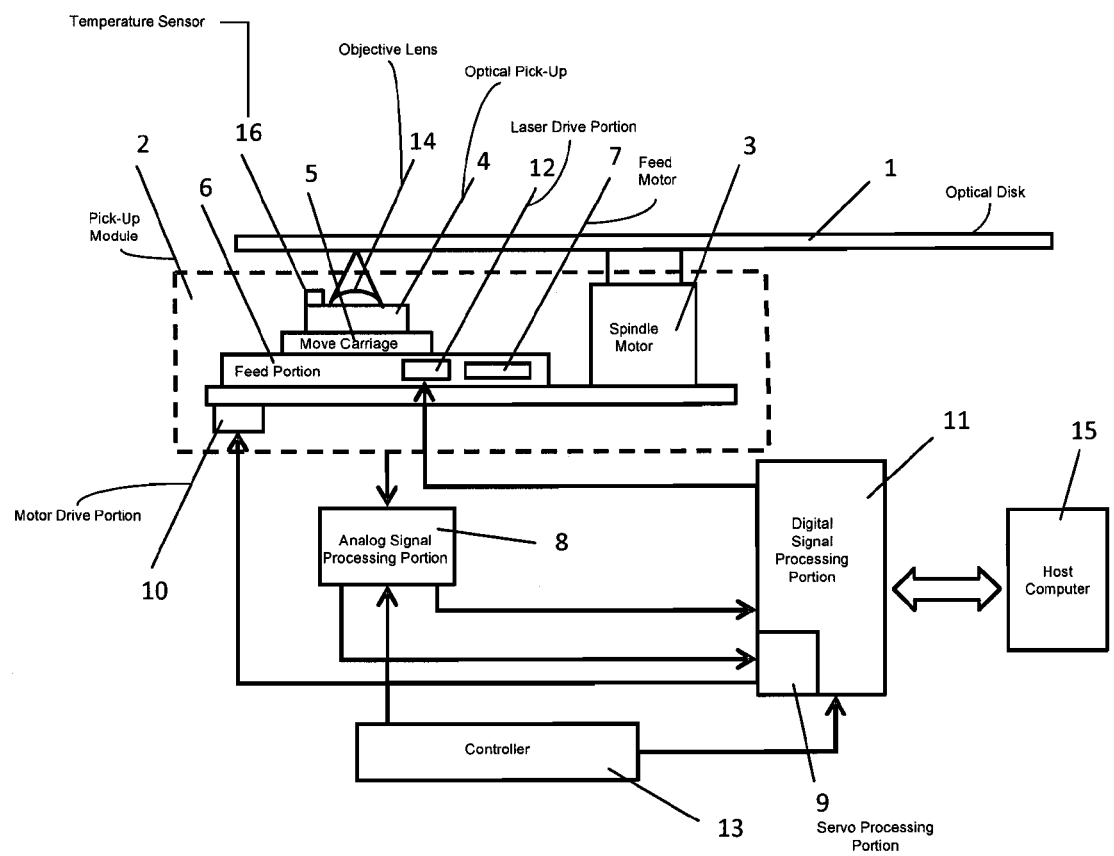
FIG. 1 is a block diagram of an optical pick-up control portion of an optical disc drive according to a first embodiment of the invention.

Referring to FIG. 1, to pick-up module 2 are independently fixed: spindle motor 3 to rotate recordable optical disc 1 either variably or constantly; PU 4 to record given information in optical disc 1 by irradiating light to optical disc 1 or to read out information on the basis of reflection light of light irradiated to optical disc 1; a LD serving as a light source of a laser beam; a driver IC serving as laser driving portion 12 to drive the light source of a laser beam; carriage 5 on which PU 4 is mounted; feed portion 6 to drive carriage 5 to reciprocate in a radius direction of optical disc 1; and feed motor 7 serving as a driving source of feed portion 6. Temperature sensor 16, serving as temperature measuring device, measures a ST of PU 4. The configuration as described enables a compact, thin optical disc drive to be achieved.

The ST measured by temperature sensor 16 reflects a temperature of at least one of the light source of a laser beam and laser driving portion 12. It may measure directly the temperature of the light source of a laser beam or laser driving portion 12, or may measure ambient temperature from which the temperature can be estimated. Temperature sensor 16 is a thermistor or the like; however, another temperature measuring device may be used. This enables control to be performed by taking into account temperatures of the light source of a laser beam and laser driving portion 12, at which temperatures will rise.

In the first embodiment, the respective members are mounted to pick-up module 2; however, at least one of the respective members may be mounted and the other members may be mounted and fixed to an internal portion of the optical disc drive.

Feed portion 6 comprises feed motor 7, a gear (not shown), a screw shaft (not shown), etc., and is configured to move carriage 5 between the inner radius and the outer radius of optical disc 1 by rotating feed motor 7.

A laser beam, using the LD in PU 4 as the light source, is irradiated to optical disc 1 from objective lens 14 by way of optical elements in PU 4. The reflection light is received at an optical sensor (not shown) in PU 4 again byway of objective lens 14 and the optical elements in PU 4.

Analog signal processing portion 8 generates a focus error signal and a tracking error signal on the basis of a signal output from the optical sensor in PU 4, and outputs these signals to servo processing portion 9 provided in digital signal processing portion 11 that constitutes recording control device.

Digital signal processing portion 11, including servo processing portion 9, comprises: an AD converter converting an analog signal sent from analog signal processing portion 8 to a digital signal; a memory storing temporarily a digital signal converted in the AD converter; an arithmetic circuit to perform computations on a digital signal stored in the memory or on a digital signal sent from the AD converter by a predetermined method; a DA converter converting a digital signal computed in the arithmetic circuit to an analog signal, etc. In particular, servo processing portion 9 is configured to perform filter signal processing and processing of various computations through digital computations, for a light beam spot to follow information tracks on optical disc 1. Digital signal processing portion 11 is thus able to set various parameters and perform sequence control flexibly according to instructions from controller 13 that constitutes correlating device.

A signal from temperature sensor 16 that has measured the ST is sent to digital signal processing portion 11 by way of analog signal processing portion 8.

Servo processing portion 9 performs control to move objective lens 14 in a focal direction/tracking direction via motor driving portion 10 and control to carry feed portion 6 as well as rotation control of spindle motor 3. During recording operations, rotation control is performed on a disc motor for a CD or a DVD to achieve a constant linear velocity (CLV); however, during playback operations, rotation control is performed on the disc motor for a disc to achieve a constant angular velocity (CAV) in obtaining a data transfer rate as high as possible. A CAV mode includes a plurality of rotational velocity modes each having a different number of rotations.

During playback operations, PU 4 irradiates a laser beam to optical disc 1 at a low output, receives reflection light from optical disc 1 at the optical sensor, and outputs a playback signal corresponding to received light to analog signal processing portion 8. Analog signal processing portion 8 further outputs the playback signal to digital signal processing portion 11.

Digital signal processing portion 11 that performs record and playback signal processing comprises a data slicer, a data PLL circuit, a jitter measurement circuit, an error correction portion, a modulation/demodulation portion, a buffer memory, a laser control portion, etc., and transfers the playback signal to host computer 15 as valid data.

During recording operations, digital signal processing portion 11 modulates data sent from host computer 15, and sends a recording instruction from the laser control portion to laser driving portion 12. Laser driving portion 12 supplies the LD with a predetermined current, and records information in information tracks on optical disc 1 by causing the LD to emit light in pulses at a high output, for example, through a method referred to as a multi-pulse recording method. Controller 13 controls the overall optical disc drive configured as has been described.

A flow of a recording method in the first embodiment of the invention will now be described.

When a recording instruction is issued and data is sent from host computer 15, digital signal processing portion 11 modulates data sent from host computer 15, and sends a recording instruction from the laser control portion to a driver IC serving as laser driving portion 12. The driver IC supplies the LD, serving as the light source of a laser beam, with a predetermined current, and thereby causes the LD to emit light at a high output for recording in information tracks on optical disc 1 to take place. Controller 13 reads the measured ST from temperature sensor 16 at predetermined intervals, and makes a comparison with a data table pre-stored in an internal memory of controller 13 serving as correlating device. In the data table, set STs are correlated with set recording rates. The set ST reflects a temperature of at least one of the light source of a laser beam and laser driving portion 12, and the maximum value of the set ST is correlated with the upper limit value or a value close to the upper limit value of the allowable temperature of the light source of a laser beam or laser driving portion 12. The set recording rate is correlated with a ratio of a recording operation time and a recording-stop operation time during an intermittent recording operation, in which a recording operation and a recording-stop operation at as low a laser beam output as playback are repeated alternately. Digital signal processing portion 11 serving as recording control device performs recording by changing a recording rate on the basis of this comparison result.

Figure 2A:
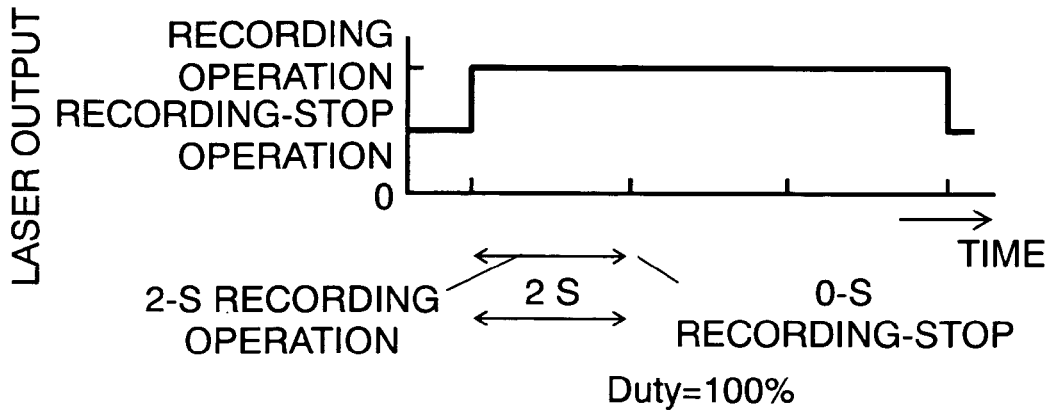
FIG. 2A is a view used to explain Duty=100%.
Figure 2B:
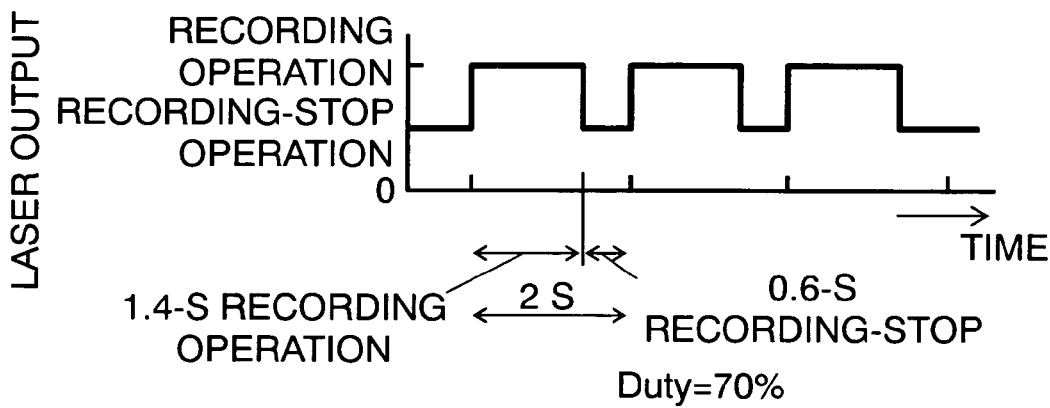
FIG. 2B is a view used to explain Duty=70%.
Figure 2C:
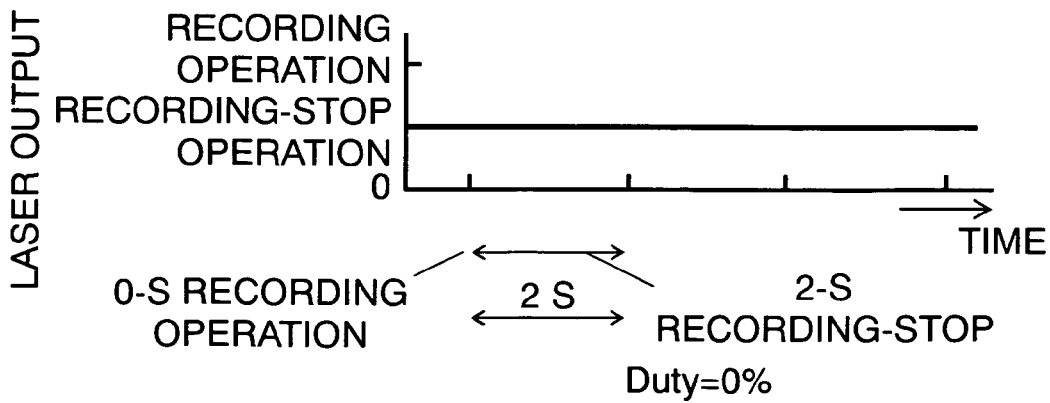
FIG. 2C is a view used to explain Duty=0%, during an intermittent recording operation by the optical disc drive according to the first embodiment of the invention.

The intermittent recording operation will now be described with reference to FIG. 2. Referring to FIG. 2, the abscissa is used for time, and the ordinate is used for an output of a laser beam. The recording operation referred to herein is an operation to record information in optical disc 1 by causing the LD to actually emit light at a high output. The recording-stop operation is an operation to stop only the recording of information by reducing an output of the LD to as low an output needed for playback. An operation to repeat the recording operation and the recording-stop operation alternately is referred to as the intermittent recording operation. A ratio of a recording operation time and a recording-stop operation time in the intermittent recording operation, that is, a recording operation time/(recording operation time+recording-stop operation time) (%), is referred to as Duty (hereinafter, referred to as Duty). In short, it is a ratio of an operation time during which information is recorded in optical disc 1 by causing the LD to actually emit light at a high output. For example, given 2 seconds as a cycle in which the recording operation and the recording-stop operation are repeated alternately (hereinafter, referred to as the cycle), then in the case of Duty=70%, as is shown in FIG. 2B, the LD emits light at a high output for 1.4 seconds, which is 70% of 2 seconds, and emits light at as low an output as playback for the remaining 0.6 second. Also, in the case of Duty=100%, as is shown in FIG. 2A, no recording-stop operation time for the laser is set during these 2 seconds. Conversely, in the case of Duty=0%, as is shown in FIG. 2C, all is set as the recording-stop operation time. Pulses of a laser beam are flashed minutely during the recording operation by the multi-pulse recording method, which, however, does not represent the intermittent recording operation referred to herein. This operation during light emission at a high output is not shown in FIG. 2, either.

It is preferable that the cycle is 0.5 second to 3 seconds, and more preferably, 1 second to 2 seconds. When the cycle is too short, the advantages of reducing heat generation by the intermittent recording operation are hard to achieve. Conversely, when the cycle is too long, a time to stop the recording operation may be extended depending on Duty, and an operation stop time for operations of host computer 15 may be extended, which possibly poses a problem in passing data with host computer 15 and operationality of host computer 15. The cycle is set to 2 second in the first embodiment for these reasons. Also, by keeping the cycle constant, control to change the recording rate becomes easier.

Recording of data is divided on time basis by the intermittent recording operation. However, in order not to cause breaks in data to be recorded on the disc surface, a location where the disc is suspend is stored when the recording operation is suspended, and the recording operation is resumed from the suspended position thus stored when the recording operation is resumed.

When Duty is reduced, heat generation in the LD can be reduced because a light-emitting time at a high output by the LD in a constant recording time becomes shorter, whereas a recording time needed to record all the data is extended because a time during which the recording operation is actually performed in the constant recording time becomes shorter. In short, Duty corresponds to a recording rate per se. It is thus preferable to set Duty to 100% or to a value as high as possible, and reduce Duty as a measure when there is a risk that the LD or the driver IC breaks as they are heated above their compensation temperatures as the ST rises.

Figure 3:
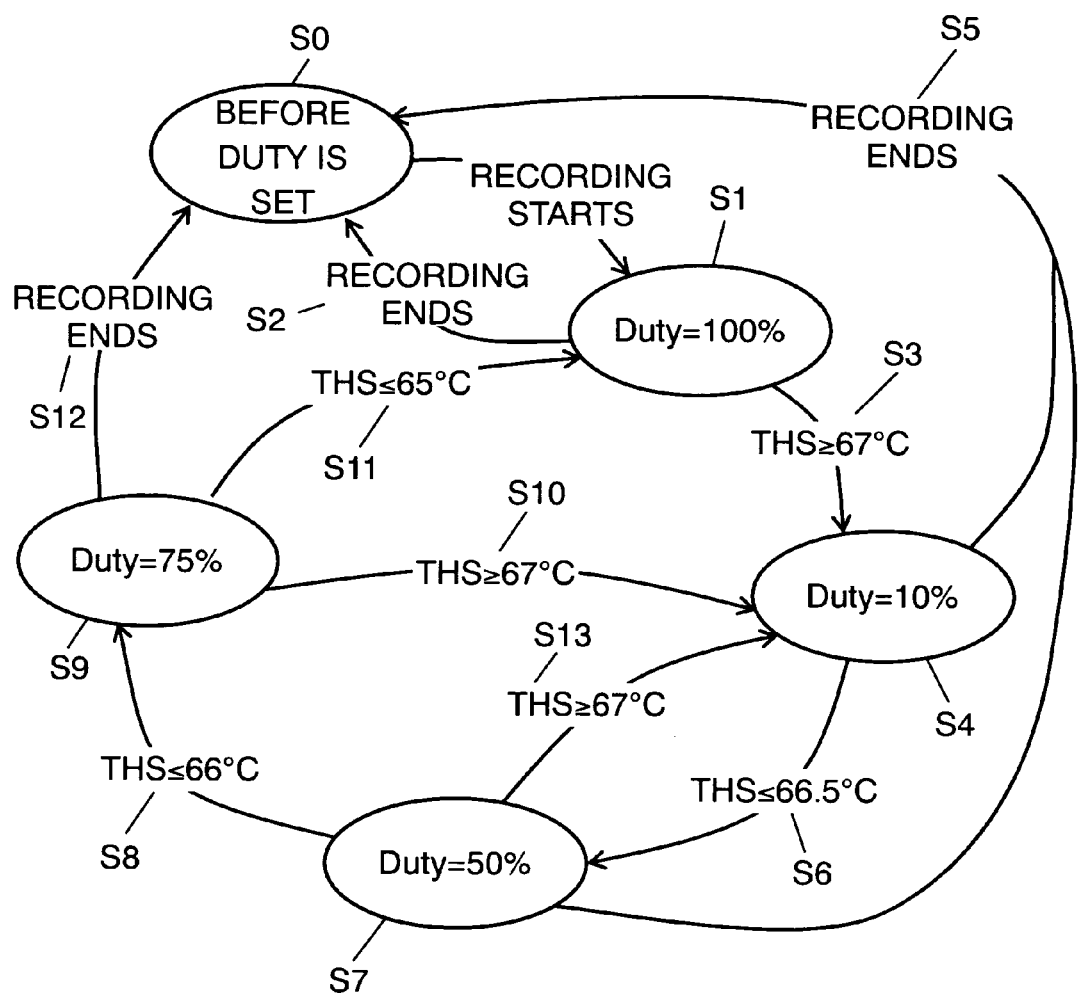
FIG. 3 is a view showing a flow of operations during recording by the optical disc drive according to the first embodiment of the invention.

A flow of the control to change the ST and Duty, that is, the recording rate, will now be described with reference to FIG. 3 and FIG. 4. In the data table stored in the internal memory of controller 13 of the first embodiment are pre-set first through fourth set STs: 67, 66.5, 66, and 65° C., and their correlated Duties: 10, 50, 75, and 100%. In this manner, as the set ST becomes higher, Duty, that is, the recording rate, is correlated with a lower value. It is thus possible to reduce heat generation in the LD and the driver IC efficiently by taking into account influences to the recording rate.

At the initial state before the recording is started, Duty is not set (S0), and Duty=100% is set when the recording is started (S1). Controller 13 reads the measured ST (MST) from temperature sensor 16 during the recording at predetermined intervals, and makes a comparison with the first set ST (67° C.) When the measured ST is lower than 67° C., the recording is continued at Duty=100%. In a case where the measured ST remains lower than 67° C. until the recording ends, the recording ends at Duty=100% (S2). A change of the measured ST in the flow of the control, (S0)–(S1)–(S2), corresponds to a curve A of FIG. 4.

In a case where the measured ST reaches or exceeds 67° C. during the recording (S3), Duty is changed to Duty=10% (S4). When Duty is reduced to as low as Duty=10%, heat generation is reduced markedly, and the measured ST drops to 67° C. or below. However, in a case where the measured ST does not drop to the second set ST (66.5° C.) even at Duty=10% because the temperature around the optical disc drive is high or for any other reason, the recording ends by keeping Duty at Duty=10% (S5). A change of the measured ST in the flow of the control, (S0)–(S1)–(S3)–(S4)–(S5), corresponds to a curve B of FIG. 4.

Heat generation in the LD is reduced by performing the recording at Duty=10%, and when the measured ST drops to 66.5° C. or below (S6), Duty is increased to Duty=50% (S7).

In a case where the recording is continued at Duty=50% and the measured ST drops further to the third set ST (66° C.) or below (S8), Duty is increased to Duty=75% (S9). In a case where the measured ST does not drop to 66° C., the recording is continued at Duty=50%. A change of the measured ST in the flow of the control, (S0)-(S1)-(S3)-(S4)-(S6)-(S7)-(S5), corresponds to a curve C of FIG. 4.

In a case where the measured ST rises again as the recoding is performed at Duty=50%, and reaches or exceeds 67° C. again (S13), Duty is reduced again to Duty=10% (S4). In a case where the measured ST rises as Duty is increased to Duty=75% and reaches or exceeds 67° C. again (S10), Duty is reduced again to Duty=10% (S4). When the recording is continued in this state until it ends, a change of the measured ST in the flow of the control, (S0)-(S1)-(S3)-(S4)-(S6)-(S7)-(S8)-(S9)-(S10)-(S4)-(S5), corresponds to a curve D of FIG. 4.

In a case where the measured ST drops further to the fourth set ST (65° C.) or below (S11), Duty is returned to Duty=100%. When the recording is continued in this state until it ends, a change of the measured ST in the flow of the control, (S0)-(S1)-(S3)-(S4)-(S6)-(S7)-(S8)-(S9)-(S11)-(S1)-(S2), corresponds to a curve E of FIG. 4.

In a case where the measured ST is maintained between 66° C. and 65° C. at Duty=75%, the recording is continued at Duty=75% (S12). A change of the measured ST in the flow of the control, (S0)-(S1)-(S3)-(S4)-(S6)-(S7)-(S8)-(S9)-(S12), corresponds to a curve F of FIG. 4.

The flow of the control to change the ST and Duty, that is, the recording rate, as described above can be expressed as follows. Recording is started from the initial state at Duty=100%, that is, the state in which the recording operation is always performed, and when the measured ST reaches the first set ST, which is the maximum set ST, Duty is changed to the correlated minimum Duty. When the measured ST drops therefrom to reach the respective set STs, Duty is changed to Duties correlated with the respective set STs. However, even when the measured ST later rises to reach the respective set STs, Duty is not changed, and the current Duty is maintained until the measured ST reaches the first set ST. In this manner, the flow of the control to change the ST and Duty, that is, the recording rate, in the first embodiment enables a fast recording rate to be achieved while maintaining the measured ST at or below the maximum set ST.

In the first embodiment, when the recording is started and at the time of the minimum set ST, Duty is set to 100%, that is, a state corresponding to the state in which the recording operation is always performed at the maximum recording rate. This is because it is preferable to perform recording at a recording rate as fast as possible in a range where the ST is relatively low. Conversely, Duty does not necessarily correspond to the state in which the recording operation is always performed, depending on the installation surroundings assumed for the drive, or the design philosophy of the drive.

The first set ST, which is the maximum set ST, is set to the upper limit value or a value close to the upper limit value of an allowable ST. Hence, the minimum Duty, that is, the minimum recording rate, needs to be set to a value at which an increase of the measured ST can be controlled in a reliable manner when the measured ST reaches the first set ST, so that temperatures of the LD serving as the light source of a laser beam and the driver IC serving as laser driving portion 12 will not exceed their compensation temperatures as a result. The case where Duty=0%, that is, the recording-stop operation is always performed, is included. In this instance, it is possible to reduce the ST in a reliable manner. In the case of the first embodiment, the minimum Duty is set to 10%. This setting is made on a basis of the empirical confirmation that Duty=10% is Duty at which an increase of the measured ST can be controlled in a reliable manner, although the recording rate drops markedly.

Four set STs and correlated Duties, that is, four recording rates are set; however, they are not limited to the above-specified values, and adequate numbers can be set. One set ST and one Duty may be set. By using this Duty when the measured ST reaches this set ST, it is possible to set the set ST and Duty in such a manner that the temperatures of the LD and the driver IC will not exceed their compensation temperatures in a reliable manner. However, when the compatibility of the reliability of the LD and the driver IC and the recording performance are considered, it is preferable to set a plurality of set STs and their correlated Duties, that is, recording rates, as in the first embodiment. Also, in this case, it is preferable to lower the correlated Duty, that is, recording rate, as the set ST becomes higher.

Alternatively, a difference between the set ST, which is set to the upper limit value or a value close to the upper limit value of the allowable ST, and the measured ST may be found to provide functions or a data table which can be used to set Duty, that is, the recording rate.

Also, the data table stored in the internal memory of controller 13 may include a time-basis change rate of the ST as the set ST, to be correlated with Duty, that is, the recording rate.

In measuring the ST, controller 13 reads the measured ST from temperature sensor 16 at predetermined intervals during recording. It is preferable that this reading cycle is at least 0.1 second or longer, and equal to or shorter than the cycle (set to 2 seconds in the first embodiment) in which the recording operation and the recording-stop operation in the intermittent recording operation are repeated alternately. This is because when the reading cycle of the measured ST becomes longer than the cycle in which the recording operation and the recording-stop operation in the intermittent recording operation are repeated alternately, the response of a change of Duty with respect to a change of the ST may be deteriorated, and when the reading cycle of the measured ST is too short, a load is applied to controller 13, and neither is preferable. In the first embodiment, the reading cycle is set to 1 second for these reasons.

Second Embodiment

A second embodiment is the same as the first embodiment in configuration and the flow of the recording method, except for the flow of the control to change the ST and Duty, that is, the recording rate.

In the second embodiment, the flow of the control to change the ST and Duty, that is, the recording rate, can be expressed as follows. Recording is started from the initial state at Duty=100%, that is, a state in which the recording operation is always performed. Duty is changed to Duties correlated with the respective set STs in both a case where the measured ST rises and reaches the respective set STs, and a case where the measured ST drops and reaches the respective set STs. That is, it is the flow of the control, by which Duty, that is, the recording rate, is reduced as the ST rises, and the temperatures of the LD serving as the light source of a laser beam and the driver IC serving as laser driving portion 12 thereby hardly exceed the upper limit values of their allowable temperatures.

Figure 5:
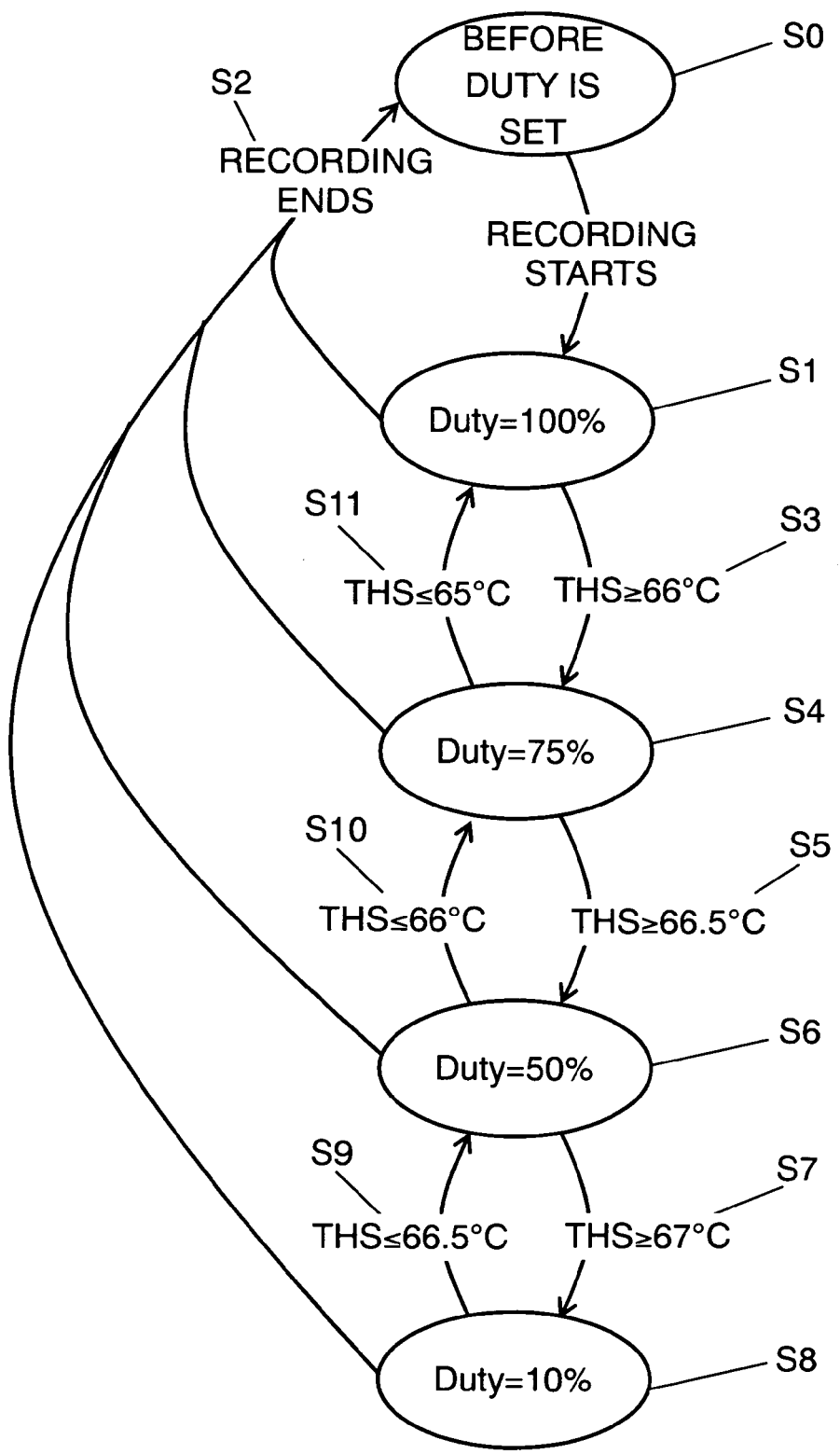
FIG. 5 is a view showing a flow of operations during recording by an optical disc drive according to a second embodiment of the invention.

The flow of the control to change the ST and Duty, that is, the recording rate, in the second embodiment will now be described with reference to FIG. 5 and FIG. 6.

The values are the same as those in the first embodiment: 2 seconds is given as the cycle in which recording and recording-stop in the intermittent recording operation are repeated; 1 second is given as the reading cycle of the measured ST; and 67, 66.5, 66, and 65° C. are given as the first through fourth set STs, respectively, and 10, 50, 75, and 100% are given as their correlated Duties in the data table stored in the internal memory of controller 13. Each value can be set to an adequate value as is with the first embodiment.

Figure 4:
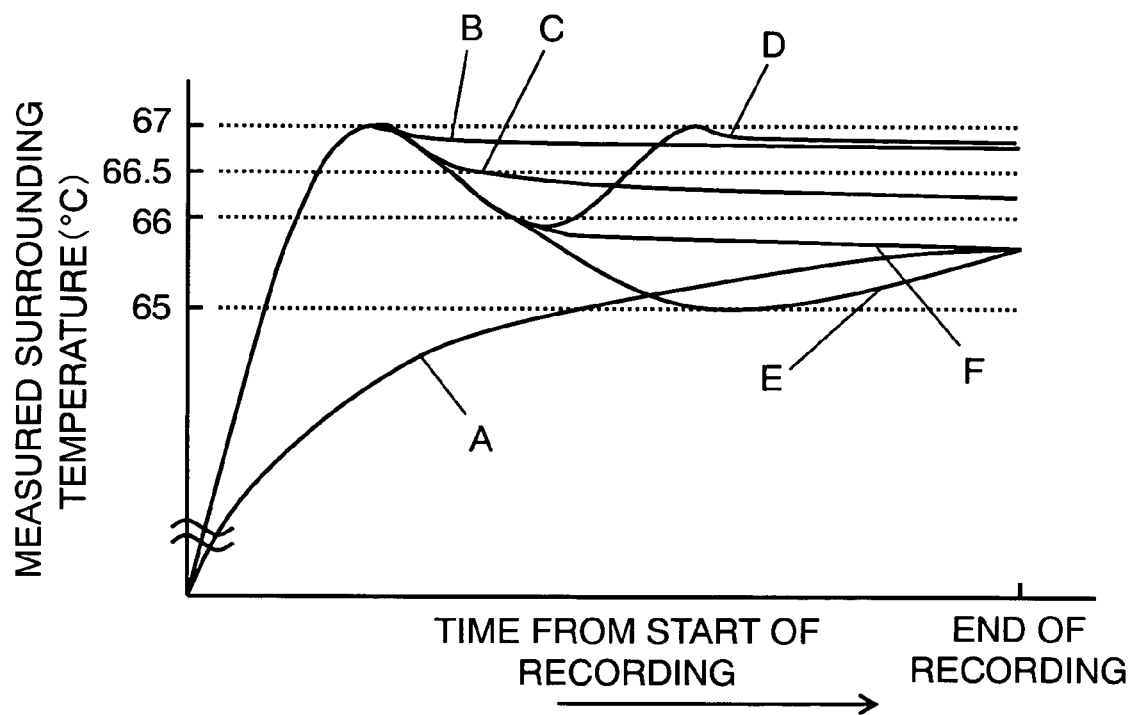
FIG. 4 is a view showing a relation between the intermittent recording operation and a ST of the optical disc drive according to the first embodiment of the invention.
Figure 6:
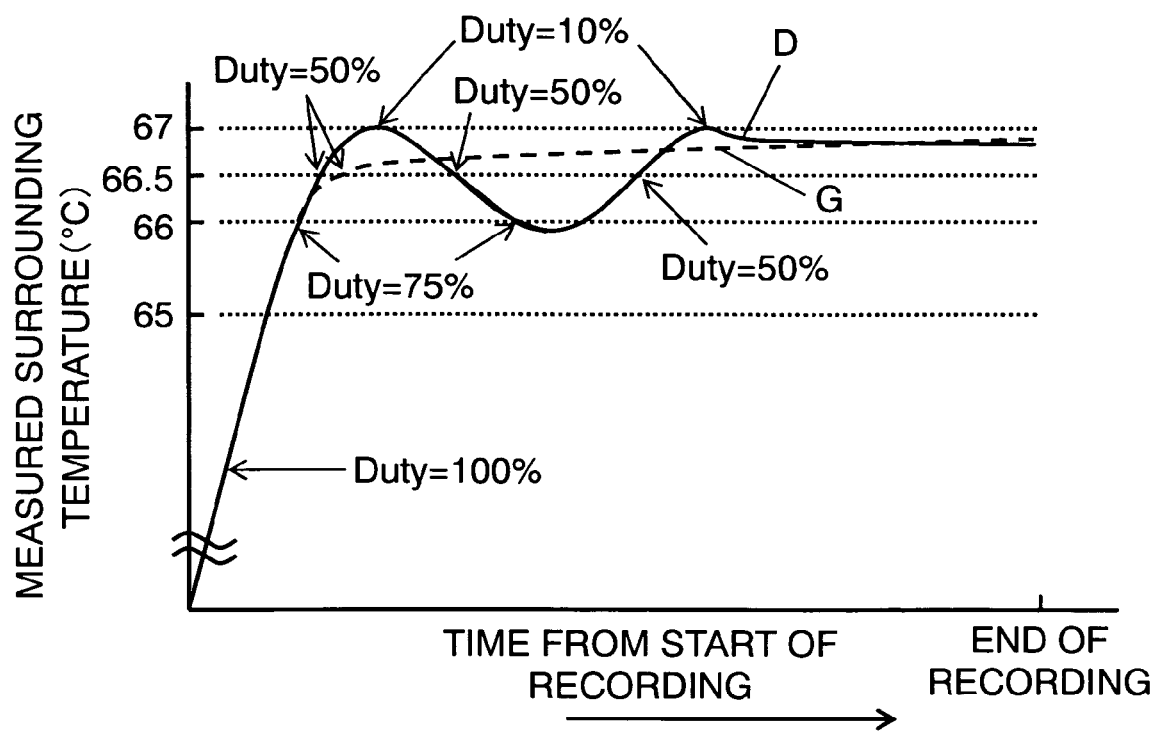
FIG. 6 is a view showing a relation between the intermittent recording operation and a ST of the optical disc drive according to the second embodiment of the invention.

A curve D of FIG. 6 is identical with the curve D of FIG. 4 in the first embodiment, and a situation that Duties are changed is also shown on the curve D. Referring to FIG. 5, the curve D can be expressed as follows. At the initial state before recording is started, Duty is not set (S0), and when the recording is to start, recording is started by setting Duty to Duty =100% (S1). The ST starts to rise as soon as the recording starts, and when the measured ST reaches the third set ST (66° C.)(S3), Duty is changed to Duty=75% (S4). When the measured ST has ceased to rise, the recording is continued until it ends (S2). When the measured ST drops to the fourth set ST (65° C.) or below (S11), Duty is returned to Duty=100% (S1).

When the ST keeps rising even at Duty=75% and reaches the second set ST (66.5° C.) (S5), Duty is changed to Duty=50% (S6). When the ST further keeps rising and reaches the first set ST (670) (S7), Duty is changed to Duty=10% (S8). The ST is thus reduced in a reliable manner.

When the ST starts to drop and reaches 66.5° C. (S9), Duty is changed to Duty=50% (S6). However, the ST keeps dropping and reaches 66° C. (S20), and Duty is changed to Duty=75% (S4). The ST then starts to rise again and reaches 66.5° C. (S5), and Duty is changed to Duty=50% (S6). The ST then reaches 67° C. (S7), and Duty is changed to Duty=10% (S8). The recording is continued in this state until it ends (S2).

The curve D of FIG. 6 corresponds to a change of the measured ST in the flow of the control, (S0)-(S1)-(S3)-(S4)-(S5)-(S6)-(S7)-(S8)-(S9)-(S10)-(S4)-(S5)-(S6)-(S7)-(S8)-(S2). Likewise, a curve G of FIG. 6 corresponds to a change of the measured ST in the flow of the control, (S0)-(S1)-(S3)-(S4)-(S5)-(S6)-(S2).

Third Embodiment

Figure 7A:
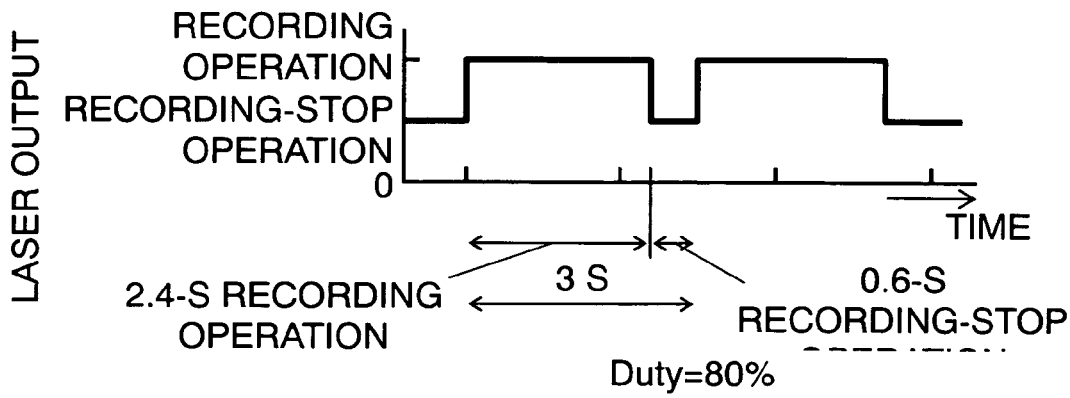
FIG. 7A is a view used to explain Duty=80%.
Figure 7B:
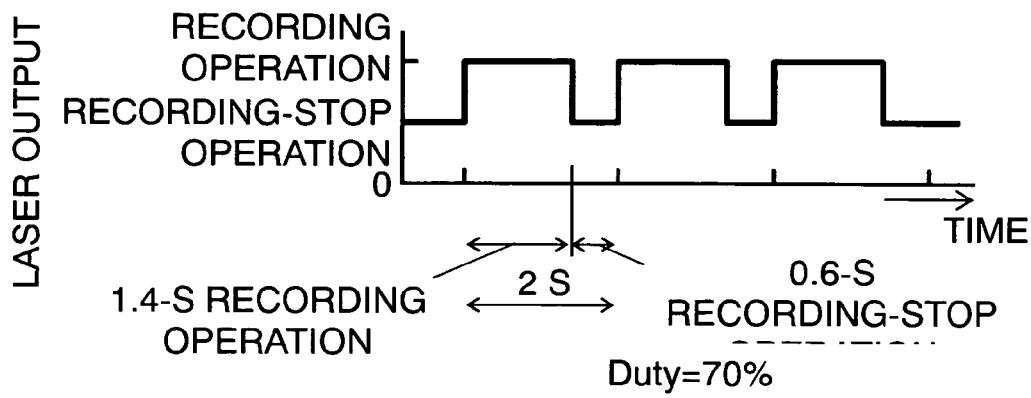
FIG. 7B is a view used to explain Duty=70%.
Figure 7C:
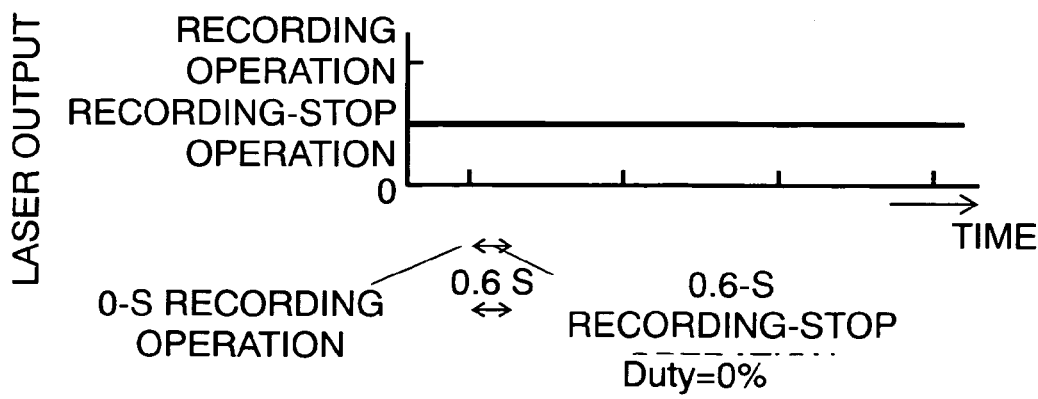
FIG. 7C is a view used to explain Duty=0%, during the intermittent recording operation by an optical disc drive according to a third embodiment of the invention.
Figure 8:
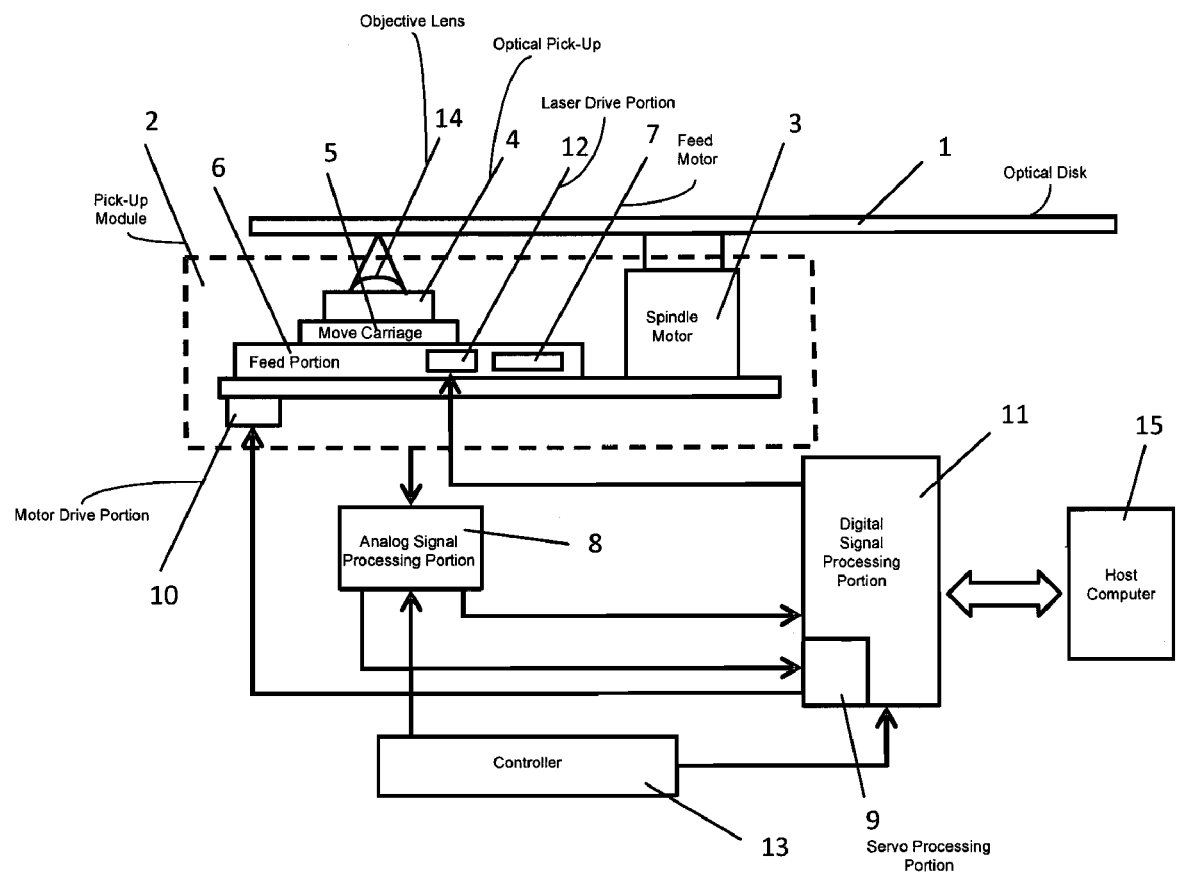
FIG. 8 is a block diagram of an optical pick-up control portion in a conventional optical disc drive.

In contrast to the first embodiment and the second embodiment where the cycle is constant, in which the recording operation and the recording-stop operation are repeated alternately, in the third embodiment, the recording-stop operation time is fixed to a constant time; however, other than that, they have totally the same configuration, the same flow of the recording method, and the same flow of the control to change the ST and Duty, that is, the recording rate. Referring to FIG. 7, the recording-stop operation time is set to 0.6 second. In FIG. 7A, the recording operation time is 2.4 seconds and the recording-stop operation time is 0.6 second at Duty=80%. In FIG. 7B, the recording operation time is 1.4 seconds and the recording-stop operation time is 0.6 second at Duty=70%. In FIG. 7C, the recording operation time is 0 second and the recording-stop operation time is 0.6 second at Duty=0%. Only at Duty=100%, the recording-stop operation time is set to 0 second to enable continuous recording.

For the same reason as described above, it is preferable that the reading cycle of the measured ST is shorter than the recording-stop operation time, which is the cycle in which the shortest recording operation and recording-stop operation are repeated alternately. Hence, 0.3 second is given in the third embodiment.

Alternatively, the recording-stop operation time may be made variable by keeping the recording operation time constant. However, in the case of the third embodiment, since the recording-stop operation time is kept constant, the operation-stop time of host computer 15 also becomes constant, which provides advantages that the control, such as data passing with host computer 15, becomes easier.

Fourth Embodiment

A fourth embodiment uses a driving current of the laser beam source as temperature sensor 16, and the other configuration, the flow of the recording method, and the flow of the control to change the ST and Duty, that is, the recording rate, are the same as those of the first embodiment through the third embodiment.

A driving current is controlled in such a manner that an output of the LD, serving as the light source of a laser beam, is always kept constant during the recording operation, during the recording-stop operation, and during playback. However, when the temperature of the LD rises, a driving current needed to emit light at the same output is increased. Hence, this driving current can be used as temperature sensor 16 of the LD. A relation between the driving current value and the temperature of the LD during the recording operation and the recording-stop operation is pre-set in the data table or functions stored in the internal memory of controller 13. By monitoring the driving current during the recording operation and the recording-stop operation, it is possible to know the temperature of the LD. As has been described, because the temperature of the LD can be known directly in the fourth embodiment, more precise, and accurate temperature control is enabled.

As has been described, the recording method for an optical disc drive of the invention prevents the LD serving as the light source of a laser beam and the driver IC serving as the laser driving portion from becoming uncontrollable as they are heated to high temperatures above their compensation temperatures during the recording operation due to own heat generation or the influences from the ambient temperature, and thereby enables the recording to be continued in a stable manner without being interrupted or stopped until it ends. Hence, it is applicable to an optical disc drive furnished with a recording function for a CD-R/RW, a DVD-R/RW/RAM, etc., which is built in an electronic device or used in an external device. Also, the optical disc drive of the invention is used by being built in or attached externally to an electronic device.

This application is based upon and claims the benefit of priority of Japanese Patent Application No.2003-384929 filed on Nov. 14, 2003, Japanese Patent Application No.2004-298716 filed on Oct. 13, 2004, the contents of which are incorporated herein by references in its entirety.

What is claimed is:

1. A recording method for an optical disc drive for recording information by irradiating a laser beam on a recording medium, comprising:

measuring a surrounding temperature using a temperature measuring device;

correlating a set surrounding temperature with a set recording rate for a multi-pulse recording operation using a correlating device; and changing a recording rate of the multi-pulse recording operation using a recording control device based on a surrounding temperature measuring result and a correlating result, wherein the recording rate of the multi-pulse recording operation is changed by changing a ratio of a recording operation time and a recording-stop operation time which are alternately repeated, a recording operation being performed by flashing pulses of the laser beam during the recording operation time, and a recording-stop operation being performed at as low a laser beam output as playback during the recording-stop operation time, and wherein a correlation between the set surrounding temperature and the set recording rate is such that the set recording rate is lower as the set surrounding temperature becomes higher, and the correlation between the set surrounding temperature and the set recording rate is such that at a start of recording, the recording rate corresponds to a case where the recording operation is always performed, when the surrounding temperature reaches a maximum set surrounding temperature, the recording rate corresponds to a recording rate at which the surrounding temperature does not rise, and when the temperature drops to respective set surrounding temperatures, the recording rate corresponds to their respective set recording rates.

2. The recording method for an optical disc drive according to claim 1, wherein
at a minimum set surrounding temperature, the recording rate corresponds to a case where the recording operation is always performed.

3. A recordin method for an optical disc drive for recording information by irradiating a laser beam on a recording medium, comprising:
measuring a surrounding temperature using a temperature measuring device;
correlating a set surrounding temperature with a set recording rate for a multi-pulse recording operation using a correlating device; and
changing a recording rate of the multi-pulse recording operation using a recording control device based on a surrounding temperature measuring result and a correlating result,
wherein the recording rate of the multi-pulse recording operation is changed by changing a ratio of a recording operation time and a recording-stop operation time which are alternately repeated, a recording operation being performed by flashing pulses of the laser beam during the recording operation time, and a recording-stop operation being performed at as low a laser beam output as playback during the recording-stop operation time, and
wherein a correlation between the set surrounding temperature and the set recording rate is such that the set recording rate is lower as the set surrounding temperature becomes higher, and the correlation between the set surrounding temperature and the set recording rate is such that at a start of recording, the recording rate corresponds to a case where the recording operation is always performed, and when the surrounding temperature reaches respective set surrounding temperatures, the recording rate corresponds to their respective set recording rates.

4. The recording method for an optical disc drive according to claim 3, wherein
at a minimum set surrounding temperature, the recording rate corresponds to a case where the recording operation is always performed.

5. An optical disc drive for recording information by irradiating a laser beam to a recording medium, comprising:
a temperature measuring device for measuring a surrounding temperature;
a correlating device for correlating a set surrounding temperature with a set recording for a multi-pulse recording operation; and
a recording control device for changing a recording rate of the multi-pulse recording apparatus based on a surrounding temperature measuring result and a correlating result,
wherein the recording rate of the multi-pulse recording operation is changed by changing a ratio of a recording operation time and a recording-stop operation time which are alternatively repeated, a recording operation being performed by flashing pulses of the laser beam during the recoding operation time, and a recording-stop operation being performed at as low a laser beam output as playback during the recording-stop operation time, and
wherein a correlation between the set surrounding temperature and the set recording rate is such that the recording rate is lower as the set surrounding temperature becomes higher, and the correlation between the set surrounding temperature and the set recording rate is such that at a start of recording, the recording rate corresponds to a case where the recording operation is always performed, when the surrounding temperature reaches a maximum set surrounding temperature, the recording rate corresponds to a recording rate at which the surrounding temperature does not rise, and when the temperature drops to respective set surrounding temperatures, the recording rate corresponds to their respective set recording rates.

6. The optical disc drive accoring to claim 5, wherein
at a minimum set surrounding temperature, the recording rate corresponds to a case where the recording operation is always performed.

7. The optical disc drive according to claim 5, wherein
the correlation between the set surrounding temperature and the set recording rate is such that at a start recording, the recording rate corresponds to a case where the recording operation is always performed, and when the surrounding temperature reaches respective set surrounding temperatures, the recording rate corresponds to their respective set recording rates.

8. The optical disc drive according to claim 7, wherein
at a minimum set surrounding temperature, the recording rate corresponds to a case where the recording operation is always performed.

* * * * *

UNITED STATES PATENT AND TRADEMARK OFFICE
CERTIFICATE OF CORRECTION

PATENT NO. : 7,539,109 B2
APPLICATION NO. : 10/982829
DATED : May 26, 2009
INVENTOR(S) : Katsuo Hori et al.

Page 1 of 1

It is certified that error appears in the above-identified patent and that said Letters Patent is hereby corrected as shown below:

In column 11, claim 3, line 31, "recordin" should read --recording--.

In column 12, claim 5, line 30, "the recording rate" should read --the set recording rate--.

In column 12, claim 7, line 49, "at a start recording" should read --at a start of recording--.

Signed and Sealed this

Third Day of November, 2009

David J. Kappos
*Director of the United States Patent and Trademark Office*